(12) United States Patent
Mani et al.

(10) Patent No.: US 8,619,962 B2
(45) Date of Patent: Dec. 31, 2013

(54) HIGH-ASSURANCE TELECONFERENCE AUTHENTICATION

(75) Inventors: Mahalingam Mani, Cupertino, CA (US); Tanjore K. Srinivas, Howell, NJ (US)

(73) Assignee: Avaya, Inc., Basking Ridge, NJ (US)

( * ) Notice: Subject to any disclaimer, the term of this patent is extended or adjusted under 35 U.S.C. 154(b) by 1178 days.

(21) Appl. No.: 12/538,674

(22) Filed: Aug. 10, 2009

(65) Prior Publication Data

US 2011/0033034 A1 Feb. 10, 2011

(51) Int. Cl.
*H04M 3/42* (2006.01)

(52) U.S. Cl.
USPC ............ 379/202.01; 379/203.01; 379/204.01; 379/205.01; 379/207.01; 370/260

(58) Field of Classification Search
USPC .......... 379/202.01–207.01; 348/14.08–14.09; 709/204, 225
See application file for complete search history.

(56) References Cited

U.S. PATENT DOCUMENTS

| 7,103,009 B1* | 9/2006 | Shaffer et al. ................. 370/260 |
| 2007/0073880 A1* | 3/2007 | Krishnakumar et al. ..... 709/225 |
| 2008/0016156 A1* | 1/2008 | Miceli et al. .................. 709/204 |
| 2008/0219426 A1 | 9/2008 | Lai |
| 2009/0154707 A1* | 6/2009 | Lee et al. ....................... 380/278 |
| 2010/0220634 A1* | 9/2010 | Gisby et al. ................... 370/261 |
| 2012/0002002 A1* | 1/2012 | Shaffer et al. .............. 348/14.09 |

* cited by examiner

*Primary Examiner* — Joseph J Nguyen

(57) ABSTRACT

A method is provided for authorizing an authenticated user into a teleconference session as a participant that avoids some of the costs and disadvantages of doing so in the prior art. The authorization is a combination of the enterprise user's authentication at work and cryptographic authorization to the teleconference system by the inviter. When a user goes to work and connects with his or her office computer to the network of the user's employer, a secure single sign-on (SSO) access control procedure is executed. In a secure single sign-on (SSO) access control procedure, the user submits authentication information, such as a user name and password, to an identity provider and receives back a credential token when the identity provider determines that the user name/password pair is valid. The credential token is saved on the user's computer and used for further authentication.

9 Claims, 4 Drawing Sheets

HIGH-ASSURANCE TELECONFERENCE AUTHENTICATION

FIELD OF THE INVENTION

The present invention relates to teleconference in general, and, more particularly, to an improved method for authorization of teleconference participants.

BACKGROUND OF THE INVENTION

Participants in a teleconference call are traditionally required to submit a personal identification number (PIN) in order to authenticate themselves and be allowed to join the teleconference call. However, personal identification numbers are insecure for several reasons.

First, in teleconference calls, the same personal identification number (PIN) is ordinarily shared among multiple participants. Therefore, a compromise of the personal identification number (PIN) by one participant in a teleconference call can lead to the security of the whole teleconference being compromised.

Second, the personal identification numbers (PINs) used for teleconference calls are cryptographically weak. The personal identification numbers (PINs) tend to be only several digits long, and, for this reason, they are usually easy to guess by third parties.

Third, personal identification numbers (PINs), in the teleconference context, are not reinforced by attack countermeasures. A common attack countermeasure is to lock an account after several unsuccessful access attempts by the same user. Since the true owner of the account is highly unlikely to misspell the correct password several times in a row, the series of unsuccessful access attempts serves as a warning that someone is trying to guess the correct password.

However, because personal identification numbers (PINs) in teleconference calls are shared, it is impossible to tell if the same person is entering the wrong personal identification number (PIN) multiple times or multiple persons are entering the wrong personal identification number (PIN) once. For this reason, attack countermeasures, such as password lockout, are not suitable in the teleconference context.

Fourth, there are no strong auditable methodologies to manage personal identification numbers (PINs) in teleconference systems. Ordinarily, security applications, such as bank account gateways, monitor the account access patterns of users by measuring how often an individual password is used. For example, if a user accesses his or her account five times in the same day, the unusual access pattern may signal that the user is not legitimate. However, because in the teleconference context, the same personal identification number (PIN) is shared among multiple users, it is impossible to tell whether a single user is using the personal identification number (PIN) in a suspicious way or whether multiple users are using the same personal identification number (PIN) in a seemingly random fashion.

Fifth, personal identification numbers (PINs) in teleconferences are long-standing—they are not updated periodically. While it is theoretically possible for personal identification numbers (PINs) to be discarded after each use and new numbers to be generated, this approach is not usually taken. Distribution and maintenance of personal identification numbers (PINs) carries significant overhead, and, for this reason, it is not usually practiced in teleconference applications. Personal identification numbers (PINs) are managed by a database on a teleconference system and not by a capable identity management system. Therefore, advanced personal identification number (PIN) management techniques are usually not implemented in teleconference systems.

Modern identity management systems, however, periodically update the authentication information for users in order to deter potential attackers. Such updates may consist of asking the user to change their passwords, user name, security question, and other authentication information. Performing such updates, narrows the time window in which an attacker can use a stolen password to break into an account.

Sixth, teleconference personal identification numbers (PINs) are vulnerable to being intercepted during transmission. When a user uses the dial pad of his telephony application to enter a personal identification number (PIN) number, the dialed number is transmitted as unencrypted dual tone multi-frequency (DTMF) signal. When this is the case, the unencrypted signals can easily be captured by an eavesdropper on the line. Therefore, the channel for transmission of personal identification numbers (PINs) is insecure and not sufficiently protected.

Seventh, keeping track of multiple identification numbers can be a source of great inconvenience to people who participate in many teleconference calls. If a person has to participate in multiple teleconference sessions on the same day, and the person has a separate personal identification number (PIN) for each session, that person can very easily become confused as to which personal identification number (PIN) is for which teleconference. Therefore, personal identification numbers (PINs) are not suitable for high-volume teleconference participants.

For these reasons, the need exists for a better method for authenticating the participants in a teleconference session.

SUMMARY OF THE INVENTION

The present invention provides a technique for authenticating and authorizing a participant in a teleconference session that avoids some of the costs and disadvantages of doing so in the prior art. When a user goes to work and connects with his or her office computer to the network of the user's employer, a single sign-on (SSO) access control procedure is executed. In a single sign-on (SSO) access control procedure, the user submits authentication information, such as a user name and password, to an identity provider (IdP) and receives back a credential token when the identity provider (IdP) determines that the user name/password pair is valid. The credential token is saved on the user's computer and used for further authentication.

When the user wants to connect to a teleconference session, the user transmits the credential token to the server in charge of the teleconference session. The server processes the credential token and permits the user to join the teleconference session if the credential token is determined to be authentic. Under this arrangement, the credential token becomes a substitute for a (shared) personal identification number (PIN), thus obviating the need for submitting a weak personal identification number (PIN) for authorization.

The present invention yields multiple advantages over the prior art.

First, credential tokens are not shared by multiple participants. Therefore, a possible loss of a credential token by one user will not compromise the access rights for the rest of the participants in the teleconference.

Second, credential tokens are cryptographically strong. As is further discussed below, credential tokens are computer files that contain encrypted information. Because the information is encrypted, credential tokens cannot be falsified—i.e. an attacker cannot generate a false credential token and pass it as an authentic one.

Third, unlike ordinary teleconference personal identification numbers (PINs), credential tokens are reinforced by attack countermeasures. Single sign on (SSO) identity providers (IdP) are sophisticated authentication systems; they have sufficient processing power at their disposal and are capable of implementing attack countermeasure techniques, such as password lockout. The partial delegation of the authentication of teleconference participants to single sing on (SSO) identity providers (IdPs) allows the introduction of attack countermeasures and other sophisticated authentication techniques to the teleconference context.

Fourth, credential tokens are more susceptible than shared personal identification numbers (PINs) to being audited. When a credential token is received at a teleconference server, the server can contact the single sign-on (SSO) identity provider (IdP) that issued the credential token in order to validate it. The identity provider (IdP) can use the requests for validation as a proxy for measuring the credential token's pattern of user. And, as discussed above, knowing the pattern of use of the credential token allows the server to single out suspicious patterns of use that indicate that the credential token has been stolen.

Fifth, tokens are not long standing. Credential tokens are generated periodically—usually every time a user logs on to his computer. If the credential token of a user is stolen, the potential for the thief to cause damage by misusing the credential token is highly limited by the fact that the token is likely to expire within a short period.

Sixth, credential tokens are less vulnerable to being intercepted during transmission. Unlike teleconference personal identification number (PIN) numbers, credential tokens are usually further encrypted before being transmitted to a teleconference server. This encryption prevents the credential tokens from being intercepted by eavesdroppers on the line of transmission.

And seventh, credential tokens relieve the need for teleconference participants to keep track of multiple personal identification numbers (PINs). Because credential tokens are not issued by teleconference servers, a user can use the same credential authentication token with multiple teleconference servers. The teleconference servers can, then, validate the authenticity of the token by contacting the identity provider (IdP) that issued the credential token directly, or by using public key cryptography. In any event, the use of credential tokens relieves the need for teleconference participants to remember multiple personal identification numbers (PINs).

The illustrative embodiment of the present invention comprises (i) receiving a user request to connect to a teleconference session; (ii) receiving a credential token authorizing the user; and (iii) authorizing the user to join the teleconference session based on the credential token.

DETAILED DESCRIPTION

Figure 1:
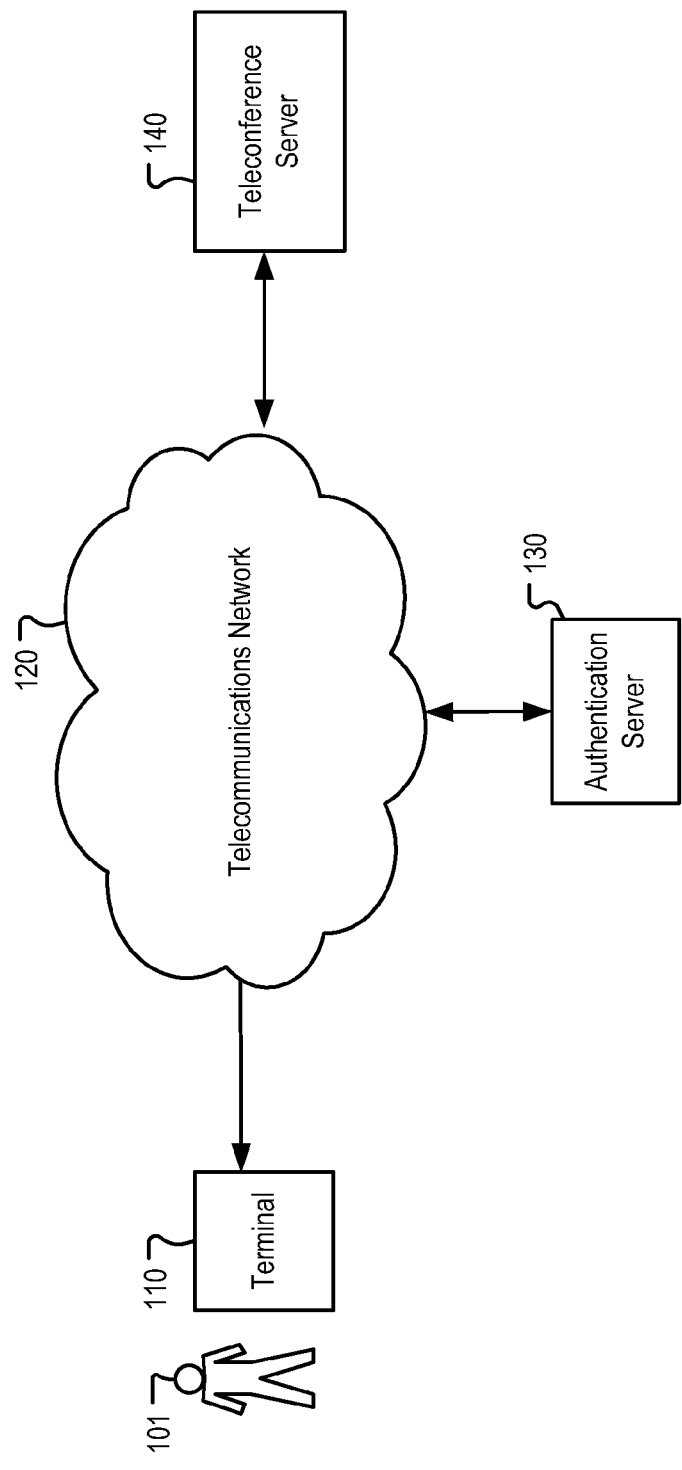
FIG. 1 depicts a schematic diagram of the salient components of the illustrative embodiment of the present invention.

FIG. 1 depicts a schematic diagram of the salient components of the illustrative embodiment of the present invention. The illustrative embodiment comprises user 101, terminal 110, network 120, server 130, and server 140.

User 101 is a natural person using terminal 110.

Terminal 110 is a personal computer that allows user 101 to connect to network 120. Terminal 110 is capable of executing telephony software that enables user 101 to connect to server 140 and participate in a teleconference session. Those skilled in the art will recognize, after reading this disclosure, how to make and use alternative embodiments of the present invention in which terminal 110 is any telecommunications device, such as, for example, and without limitation, a cellular telephone, portable digital assistant (PDA), etc.

Network 120 is a telecommunications network that transports signals between terminal 110, server 130, and server 140. In accordance with the illustrative embodiment of the present invention, network 120 is a local area network, but it will be clear to those skilled in the art, after reading this disclosure, how to make and use alternative embodiments of the present invention in which network 120 is another type of telecommunications network (e.g. the Internet, Public Switched Telephone Network, a cellular telephone network, wide area network, etc.).

Server 130 is an identity provider. Server 130 offers identity-related services that are the basis for forming trust between terminal 110, server 140, and other nodes connected to network 120. In accordance with the illustrative embodiment, server 130 is a Single Sign-on Identity provider. However, it will be clear to those skilled in the art, after reading this disclosure, how to make and use alternative embodiments of the present invention, in which server 130 is any type of device capable of authenticating a user and issuing a credential token. Furthermore, in accordance with the illustrative embodiment server 130 maintains a profile of user 101 which includes information about attributes possessed by user 101, such as, for example, and without limitation, employment status, affiliation with a particular department of a company, age, type of security clearance, membership into a group, etc. However, those skilled in the art will recognize, after reading this disclosure, how to make and use alternative embodiments of the present invention, in which server 130 does not maintain a such user profile.

Server 140 is a teleconference server. Server 140 receives voice and other media streams and distributes the streams towards the participants in a teleconference session. It will be clear to those skilled in the art how to make and use server 140.

Figure 2:
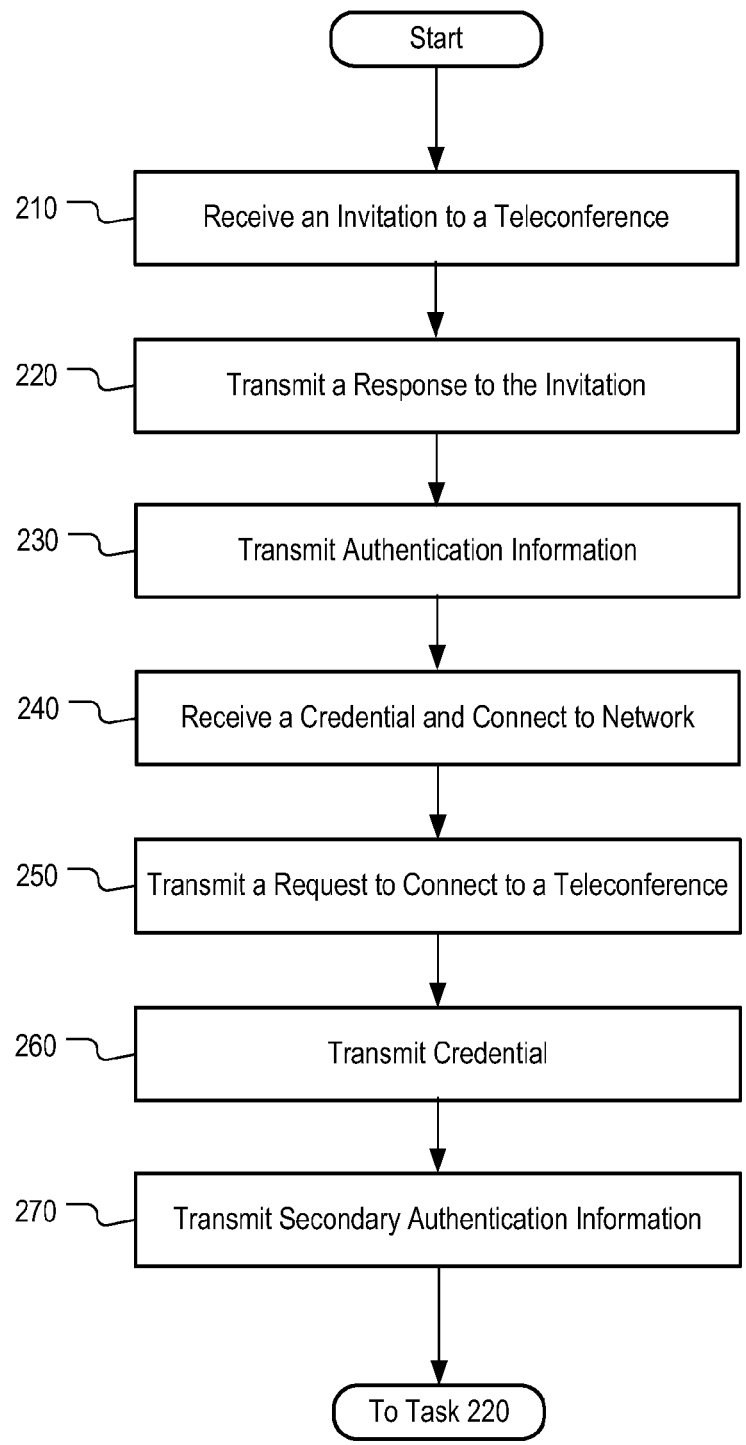
FIG. 2 depicts a flowchart of the execution of the salient tasks associated with the operation of the illustrative embodiment of the present invention performed by terminal 110.

FIG. 2 depicts a flowchart of the execution of the salient tasks associated with the operation of the illustrative embodiment of the present invention performed by terminal 110. It will be clear to those skilled in the art, after reading this disclosure, how to perform the tasks associated with FIG. 2 in a different order than represented or to perform one or more of the tasks concurrently. Furthermore, it will be clear to those skilled in the art, after reading this disclosure, how to make and use alternative embodiments of the present invention that omit one or more of the tasks.

At task 210, terminal 110 receives an invitation to a teleconference. The invitation indicates the time at which the teleconference will be held and a teleconference identifier (ID). Those skilled in the art will recognize, after reading this disclosure, how to make and use alternative embodiments of the present invention in which the invitation contains any information concerning the teleconference, such as, for example, and without limitation, number of participants in the teleconference, identities of the participants, media mode of the teleconference (e.g. sound, text, video, etc.), and so forth.

At task 220, server 110 transmits a response to the invitation received at task 210. The response is a message indicating the intention of user 101 to participate in the teleconference. It will be clear to those skilled in the art, after reading this disclosure, how to make and use alternative embodiments of the present invention in which the response contains any information concerning the participation of user 101 in the teleconference, such as, for example, and without limitation, acceptance, rejection, tentative acceptance, tentative rejection, etc. Furthermore, it will be clear to those skilled in the art, after reading this disclosure, how to make and use alternative embodiments of the present invention in which the response indicates an acceptance that is conditional on the occurrence of an event, such as, for example, and without limitation, the reaching of a price threshold by a type of stock, winning of a sports team, etc. An example of such conditional response is an indication that the user will participate in the teleconference only if the stock of a specific company reaches a trading price of five dollars.

At task 230, terminal 110 transmits authentication information for user 101 to server 130. In accordance with the illustrative embodiment, terminal 110 transmits a user name/password pair that belongs to user 101 in order to validate the user's identity. Server 130, in a well-known fashion, authenticates the user name/password pair and upon a successful authentication, server 130 issues a credential token. Although, in the illustrative embodiment a user name/password pair is used as a means of authenticating user 101 to server 130, it will be clear to those skilled in the art, after reading this disclosure, how to make and use alternative embodiments of the present invention in which any information capable of proving the identity of user 101 is used, such as, for example, and without limitation, a user name, password, answer to a security question, personal identification number, etc.

At task 240, terminal 110 receives a credential token from server 130 and connects to network 120. The credential token is a computer file which contains one or more user attributes encoded in it. The credential token is stored on terminal 110 and it provides a way for terminal 110 to signal to server 140 that the identity of the user of terminal 110 has been authenticated by a trusted party. In accordance with the illustrative embodiment, an identifier for user 101 is encoded in the credential token, but it will be clear to those skilled in the art, after reading this disclosure, how to make and use alternative embodiments of the present invention in which any possible attribute possessed by user 101 is encoded in the credential token, such as, for example, and without limitation, age, gender, employment, position within a company, role, type of security clearance, etc. Furthermore, in accordance with the illustrative embodiment of the present invention, the identifier encoded in the credential is the name of the user, but those skilled in the art will recognize how to make and use alternative embodiments of the present invention in which the identifier is any information capable of being used to distinguish user 101, such as, for example, and without limitation, user's teleconference attributes (e.g. bandwidth, codec, etc.), Social Security number, employer identification number, account number, etc.

At task 250, terminal 110 submits a request to server 110 to connect to the teleconference session for which an invitation was received at task 210. It will be clear to those skilled in the art how to execute task 250.

At task 260, terminal 110, in a well-known fashion, transmits the credential token to server 140.

At task 270, terminal 110 transmits secondary authentication information to server 140. In accordance with the illustrative embodiment, the secondary authentication information is the answer to a security question, but it will be clear to those skilled in the art, after reading this disclosure, how to make and use alternative embodiments of the present invention in which the secondary authentication information is any information capable of being used to authenticate user 101, such as, for example, and without limitation, a user name, password, personal identification number, etc.

Figure 3:
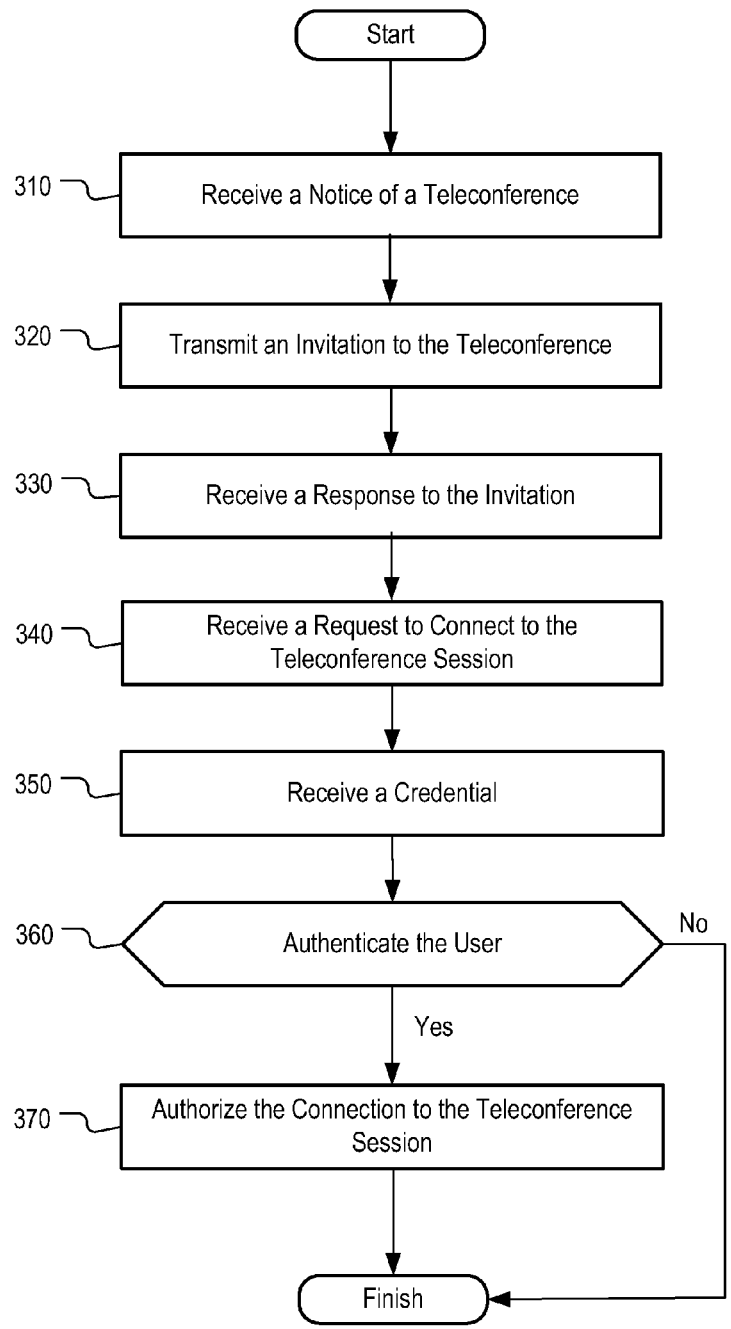
FIG. 3 depicts a flowchart of the execution the salient tasks associated with the operation of the illustrative embodiment of the present invention performed by server 140.

FIG. 3 depicts a flowchart of the execution the salient tasks associated with the operation of the illustrative embodiment of the present invention performed by server 140. It will be clear to those skilled in the art, after reading this disclosure, how to perform the tasks associated with FIG. 3 in a different order than represented or to perform one or more of the tasks concurrently. Furthermore, it will be clear to those skilled in the art, after reading this disclosure, how to make and use alternative embodiments of the present invention that omit one or more of the tasks.

At task 310, server 140 receives a notice of teleconference. The notice indicates, the time at which a teleconference will take place, a teleconference identifier, list of prospective teleconference participants who are invited to join the teleconference, and attribute which all invitees must possess in order to be allowed to join the teleconference. However, it will be clear to those skilled in the art, after reading this disclosure, how to make and use alternative embodiments of the present invention in which the notice of teleconference does not indicate one or more of the requisite attribute, list of invitees, time, and a teleconference identifier.

In accordance with the illustrative embodiment of the present invention, the attribute is the possession of a confidential security clearance. However, it will be clear to those skilled in the art, after reading this disclosure, how to make and use alternative embodiments of the present invention in which any attribute is specified, such as, for example, and without limitation, employment in company, affiliation with a particular department of a company, age, other types of security clearance, etc. Furthermore, it will be clear to those skilled in the art, after reading this disclosure, how to make and use alternative embodiments of the present invention in which the notice contains other information concerning the teleconference, such as, for example, and without limitation, media used in the teleconference (e.g. sound, text, video, etc.), subject of discussion, etc.

In accordance with the illustrative embodiment, the list of invitees indicated in the notice of teleconference includes the names of individuals who are invited to participate in the teleconference session. Although, in the illustrative embodiment names the invitees are identified in the list by their names, it will be clear to those skilled in the art, after reading this disclosure, how to make and use alternative embodiments of the present invention in which other identifiers are used, such as, for example, and without limitation, employee numbers, Social Security numbers, etc. And still furthermore, those skilled in the art will recognize, after reading this disclosure, that alternative embodiments of the present invention can be devised in which the list of invitees refers to a group of people who are invited, such as, for example, and without limitation, the members of a book club, members in an outdoors club, employees in a particular company department, etc.

At task 320, server 140 transmits invitations the teleconference session to one or more of the persons included in the list of invitees. Specifically, server 140 transmits an invitation to user 101.

At task 330, server 140 receives and stores the response to the invitation transmitted to user 101.

At task 340, server 140 receives the request of user 101, transmitted by terminal 110, to connect to the teleconference session.

At task 350, server 140 receives the credential token.

At task 360, server 140 authenticates user 101. If the user is successfully authenticated, server 140 proceeds to execute task 370. The authentication of user 101 is described in further detail in the discussion with respect to FIG. 4.

At task 370, server 140, in a well-known fashion, authorizes terminal 110 to connect to the teleconference session.

Figure 4:
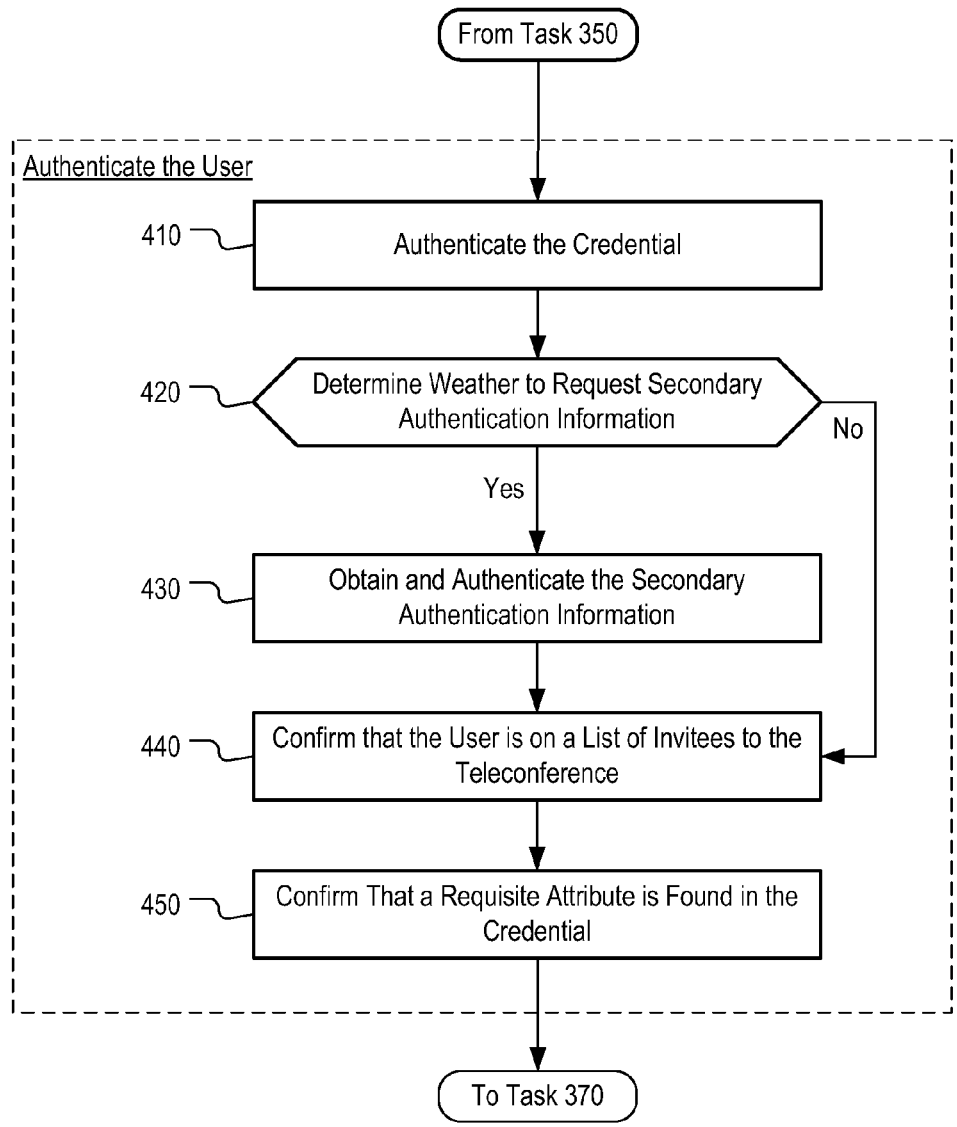
FIG. 4 depicts a flowchart of the execution of the salient sub-tasks associated with the performance of task 360.

FIG. 4 depicts a flowchart of the execution of the salient sub-tasks associated with the performance of task 360. It will be clear to those skilled in the art, after reading this disclosure, how to perform the tasks associated with FIG. 4 in a different order than represented or to perform one or more of the tasks concurrently. Furthermore, it will be clear to those skilled in the art, after reading this disclosure, how to make and use alternative embodiments of the present invention that omit one or more of the tasks.

At task 410, server 140 authenticates the credential token received at task 350. In accordance with the illustrative embodiment of the present invention, server 140 authenticates the credential token by querying server 130 for the token's authenticity. However, it will be clear to those skilled in the art, after reading this disclosure, how to make and use alternative embodiments of the present invention in which server 140 authenticates the credential token in an autonomous fashion, without interacting with server 130 every time it receives a credential, by using public key decryption or other similar techniques.

At task 420, server 140 determines whether to request secondary authentication information. In accordance with the illustrative embodiment, server 140 requests secondary authentication information if the of user 101 to the invitation to the teleconference session is inconsistent with the request to connect terminal 110 to the teleconference session. For example, if user 101 rejects the invitation to the teleconference session and, subsequently, the user, via terminal 110, attempts to connect to the teleconference session, the request to connect is inconsistent with the user's response to the invitation. In such case, the inconsistency signals an elevated risk that the party attempting the connection is impersonating user 101. And therefore, when such inconsistency is detected, server 140 requires secondary authentication information from the party requesting the connection in order to dispel any doubts about the party's identity and confirm that the party is indeed user 101.

Furthermore, it will be clear to those skilled in the art, after reading this disclosure, how to make and use alternative embodiments of the present invention in which at task 420, server 140 connects to a server in order to determine whether a condition specified by user 101 as a prerequisite for the user's participation in the teleconference is met. For example, and without limitation, in a situation a in which the user's participation is conditional on a sports team winning, server 140 contacts another server, that is capable of providing information about sports scores, in order to determine whether the sports team won. Similarly, in another situation in which the participation of the user is conditional on the reaching of a price threshold by a certain type of stock, server 140 queries a server, that is capable of providing market information, in order to determine whether the type of stock has reached the price threshold. When the prerequisite for the user's participation in a teleconference session is not met, but a request from the user to connect to the teleconference session is still received, server 140, in the fashion, and for the reasons, described above, requests secondary authentication information.

At task 430, server 140 obtains and authenticates the secondary authentication information for user 101. In accordance with the illustrative embodiment, the secondary authentication information is obtained after transmitting a request for it to terminal 110. As described in the discussion with respect to task 270, the secondary authentication information is the answer to a security question, but it will be clear to those skilled in the art, after reading this disclosure, how to make and use alternative embodiments of the present invention in which the secondary authentication information is any information capable of being used to authenticate user 101, such as, for example, and without limitation, a user name, password, personal identification number, etc.

At task 440, server 140 determines whether user 101 is included in the list of invitees to the teleconference. Server 140 compares an identifier for user 101 to the identifiers included in the list of invitees and determines whether user 101 is invited to participate in the teleconference. If the user is not included in the list of invitees, server 140 rejects the user's request to connect to the teleconference session. In accordance with the illustrative embodiment, the identifier for user 101 is encoded in the credential token, but it will be clear to those skilled in the art, after reading this disclosure, how to make and use alternative embodiments of the present invention in which the identifier is not encoded in the credential token, and instead, server 140 obtains the identifier by querying server 130 for the identity of the user associated with the credential token. Furthermore, in alternative embodiments of the present invention in which the list of invitees specifies a group of people rather than identifying individual persons, server 140 queries server 130 in order to determine whether user 101 belongs in the group specified.

At task 450, server 140 determines whether user 101 possesses the requisite attribute specified in the notice of teleconference received at task 310. In accordance with the illustrative embodiment, server 140 queries server 130 to determine whether the profile of user 101 stored at server 130 indicates that user 101 possess a confidential security clearance. Although in the illustrative embodiment, the attribute is determined by querying server 140, it will be clear to those skilled in the art, after reading this disclosure, how to make and use alternative embodiments of the present invention in which server 140 processes the credential token to obtain an indication of an attribute that is encoded inside the credential token.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
  receiving at a teleconference server:
    (i) a request from a user of a telecommunications terminal to allow the telecommunications terminal to connect to a teleconference session, and (ii) a credential token from the telecommunications terminal that:
  (a) is issued by an authentication server when the authentication server authorizes the telecommunications terminal to connect to a telecommunications network, and
  (b) authenticates the user of the telecommunications terminal;
authorizing the telecommunications terminal to connect to the teleconference session based on the credential token;
determining, by a teleconference server, whether to request secondary authentication information from a non-authentication server;
if said process of determining determines to request secondary authentication information, obtaining and authenticating the secondary authentication information;
transmitting an invitation to the teleconference session to the person; and requesting a pre-determined secondary-authentication data if the invitation was not accepted.

2. The method of claim 1 comprising:
receiving at the teleconference server a list of persons who are invited to join the teleconference session; and
authorizing the telecommunications terminal to connect to the teleconference session only if the user of the telecommunications terminal is included on the list of persons who are invited to join the teleconference session.

3. The method of claim 1 wherein the credential token indicates an attribute of the person, the method comprising:
receiving at the teleconference server a list of persons who are invited to join the teleconference session; and
authorizing the telecommunications terminal to join the teleconference based on the comparison of the attribute received with the credential token and attributes in the list.

4. The method of claim 1 wherein the credential token is a Single Sign-on token.

5. The method of claim 1 where in the credential token is issued when the person connects to an enterprise network.

6. A method comprising:
receiving a credential token authenticating the identity of a user of a telecommunications terminal when the telecommunications terminal connects to a network;
transmitting the credential token to a teleconference server;
connecting to a teleconference session if the credential token is accepted by the teleconference server;
determining, by a teleconference server, whether to request secondary authentication information from a non-authentication server; and
if said process of determining determines to request secondary authentication information, obtaining and authenticating the secondary authentication information;
receiving an invitation to the teleconference session; and
transmitting a pre-determined secondary authentication data if the invitation was not responded to with an acceptance.

7. The method of claim 6, wherein:
the credential token authenticates the identity of the user of the telecommunications terminal; and
the connecting to the teleconference session is conditional on the user of the telecommunications terminal being included in a list of people who were invited to the teleconference session.

8. The method of claim 6 wherein the credential token is a Single Sign-on token.

9. The method of claim 6 where in the credential token is issued when the telecommunications terminal connects to an enterprise network.

* * * * *